(12) United States Patent
Avidan et al.

(10) Patent No.: US 10,372,731 B1
(45) Date of Patent: Aug. 6, 2019

(54) METHOD OF GENERATING A DATA OBJECT IDENTIFIER AND SYSTEM THEREOF

(71) Applicant: MINEREYE LTD., Hod Hasharon (IL)

(72) Inventors: Yaniv Avidan, Moshav Mahseya (IL); Avner Atias, Kfar Yona (IL)

(73) Assignee: MINEREYE LTD., Hod Hasharon (IL)

( * ) Notice: Subject to any disclaimer, the term of this patent is extended or adjusted under 35 U.S.C. 154(b) by 86 days.

(21) Appl. No.: 15/360,612

(22) Filed: Nov. 23, 2016

Related U.S. Application Data

(60) Provisional application No. 62/259,749, filed on Nov. 25, 2015.

(51) Int. Cl.
| | | |
|---|---|---|
| G06F 17/30 | (2006.01) | |
| G06F 16/28 | (2019.01) | |
| G06F 16/22 | (2019.01) | |

(52) U.S. Cl.
CPC ........ *G06F 16/285* (2019.01); *G06F 16/2219* (2019.01); *G06F 16/2237* (2019.01); *G06F 16/2264* (2019.01)

(58) Field of Classification Search
USPC ........................................ 707/737, 698, 728
See application file for complete search history.

(56) References Cited

U.S. PATENT DOCUMENTS

| | | | |
|---|---|---|---|
| 7,251,637 B1 | 7/2007 | Caid et al. | |
| 7,814,078 B1 * | 10/2010 | Forman | G06F 17/30486 707/698 |
| 8,270,733 B2 * | 9/2012 | Cobb | G06K 9/6251 340/853.2 |
| 2014/0079316 A1 * | 3/2014 | Vitaladevuni | G06T 7/0079 382/159 |
| 2016/0012343 A1 * | 1/2016 | Flinn | G06N 7/02 706/52 |
| 2017/0235820 A1 * | 8/2017 | Conrad | G06F 17/2211 707/728 |

FOREIGN PATENT DOCUMENTS

WO     2011/070832     6/2011

* cited by examiner

*Primary Examiner* — Hung T Vy
(74) *Attorney, Agent, or Firm* — Browdy and Neimark, P.L.L.C.

(57) ABSTRACT

Generating a data object identifier by dividing the data in the data object into a plurality of chunks; processing each chunk using a clustering algorithm to generate, for each chunk, a pair of values characterizing the data in the chunk, thereby giving rise to a plurality of pairs of values (PoV); generating a plurality of nodes in a two dimensional space each corresponding to a respective PoV, wherein, for any given PoV, the values in the given PoV are indicative of location coordinates of the corresponding node in the two dimensional space; generating a plurality of features related to the plurality of nodes, each feature characterizing a spatial relationship between three or more nodes; and generating the data object identifier by arranging the features in a feature vector in accordance with predetermined rules.

17 Claims, 9 Drawing Sheets

Fig. 5

| | Pair of Values (PoV) | | X,Y coordinates of corresponding node in 2D space |
| --- | --- | --- | --- |
| | First value | Second value | |
| Chunk 1 | 201 | 45 | 201,45 |
| Chunk 2 | 48 | 221 | 48,221 |
| Chunk 3 | 187 | 38 | 187,38 |
| Chunk 4 | 47 | 189 | 47,189 |
| Chunk 5 | 199 | 49 | 199,49 |
| Chunk 6 | 50 | 193 | 50,193 |
| Chunk 7 | 47 | 206 | 47,206 |
| Chunk 8 | 44 | 208 | 44,208 |
| Chunk 9 | 57 | 213 | 57,213 |
| Chunk 10 | 56 | 187 | 56,187 |
| Chunk 11 | 185 | 55 | 185,55 |
| Chunk 12 | 55 | 183 | 55,183 |
| Chunk 13 | 134 | 30 | 134,30 |

$f_1 = (\vartheta\_1) = 0.29393567$ $f_2 = (\vartheta\_2) = 1.74445116$ $f_3 = (\vartheta\_3) = 1.10320582$ $f_4 = (d\_1:d\_2) = 1.103402$ $f_5 = (d\_2:d\_3) = 3.081088$ $f_6 = (d\_1:d\_3) = 3.39968$

US 10,372,731 B1

METHOD OF GENERATING A DATA OBJECT IDENTIFIER AND SYSTEM THEREOF

CROSS-REFERENCE TO RELATED APPLICATIONS

The present application claims benefit from U.S. Provisional Patent Application No. 62/259,749, filed on Nov. 25, 2015, incorporated hereby by reference in its entirety.

TECHNICAL FIELD

The presently disclosed subject matter relates to data object identifiers and, more particularly, to generating a data object identifier.

BACKGROUND

In the last four years organizations have been experiencing a massive increase in the number of computers, network endpoints, and smart devices that connect to the organizational network. The increase in the volume of the data and the variety of data formats, combined with the development in the sophistication of the methods in which data is being stolen from within the organization have started to become a substantial challenge for companies and their CISO's, Fraud Managers and Risk Managers. To combat this challenge, companies often employ data protection (DP) systems to identify and control access to sensitive data (SD).

Current DP systems on the market today can he divided in two types. The first type of DP system uses classification techniques to scan file contents tot particular strings, keywords or data structures which are then used to classify the files as containing SD or not. However, in most cases the classification technologies are rather primitive and rely primarily on rule engines in order to find and protect SD. Thus, the responsibility lies with the analyst to be able to define a robust enough set of rules for identifying SD.

More advanced DP systems use statistical fingerprinting technologies or hashing to generate a digital fingerprint of each tile to he scanned, and compare the fingerprint to a fingerprints database containing fingerprints for fries known to contain SD. Statistical fingerprinting techniques typically calculate certain statistical features of the file bytes heap, and use these statistical features to re-identify the same file, including after having undergone some changes. The hashing method generates a single hash number from the file byte heap using common hashing algorithms (MD5, SHA1, SHA256, etc.), which it then uses to re-identify the files.

However these methods of digital fingerprinting lack a sufficient degree of accuracy and have been known to generate a relatively large number of false positives and false negatives. In addition, these methods are not well equipped to handle cases where a file's content is modified in order to avoid detection (e.g. by changing the file format, cutting the file to several smaller files, insertion of data into other files, encryption, obfuscation, etc. ). Significant changes to certain elements of the file will sometimes result in a new digital fingerprint, thus preventing the system of identifying the changed file as a modified version of the original file. In addition, some of these methods generate fingerprints having a byte size that increases with the size of the original file, thus requiring a large amount of storage capacity in order to store the fingerprints.

GENERAL DESCRIPTION

In accordance with certain aspects of the presently disclosed subject matter, there is provided a method of generating a data object identifier comprising: upon receiving a data object, dividing the data in the data object into a plurality of chunks; processing each chunk using a clustering algorithm to generate, for each chunk, a pair of values characterizing the data in the chunk, thereby giving rise to a plurality of pairs of values (PoV); generating a plurality of nodes in a two dimensional space each corresponding to a respective PoV, wherein, tor any given PoV, the values in the given PoV are indicative of location coordinates of the corresponding node in the two dimensional space; generating a plurality of features related to the plurality of nodes, each feature characterizing a spatial relationship between three or more nodes; generating the data object identifier by arranging the features in a feature vector in accordance with predetermined rules.

In accordance with other aspects of the presently disclosed subject matter, there is provided a system capable of generating a data object identifier comprising a processor and memory block operatively coupled to one or more data repositories, the processor and memory block configured to: upon receiving a data object stored on the one or more data repositories, divide the data in the data object into a plurality of chunks; process each chunk using a clustering algorithm to generate, for each chunk, a pair of values characterizing the data in the chunk, thereby giving rise to a plurality of pairs of values (PoV); generate a plurality of nodes in a two dimensional space each corresponding to a respective PoV, wherein, for any given PoV, the values in the given PoV are indicative of location coordinates of the corresponding node in the two dimensional space; generate a plurality of features related to the plurality of nodes, each feature characterizing a spatial relationship between three or more nodes; and generate the data object identifier by arranging the features in a feature vector in accordance with predetermined rules.

In accordance with other aspects of the presently disclosed subject matter, there is provided a non-transitory computer-readable memory tangibly embodying a program of instructions executable by a computer for executing a method of generating a data object identifier, the method comprising: upon receiving a data object, dividing the data in the data object into a plurality of chunks; processing each chunk using a clustering algorithm to generate, for each chunk, a pair of values characterizing the data in the chunk, thereby giving rise to a plurality of pairs of values (PoV); generating a plurality of nodes in a two dimensional space each corresponding to a respective PoV, wherein, for any given PoV, the values in the given PoV are indicative of location coordinates of the corresponding node in the two dimensional space; generating a plurality of features related to the plurality of nodes, each feature characterizing a spatial relationship between three or more nodes; and generating the data object identifier by arranging the features in a feature vector in accordance with predetermined rules.

In accordance with further aspects and, optionally, in combination with other aspects of die presently disclosed subject matter the data can be divided into chunks using a predetermined value n indicative of a maximum chunk size. The PoV for a chunk can be generated by processing the data in the chunk using a clustering algorithm. The clustering algorithm can be a self-organizing map algorithm In accordance with further aspects and, optionally, in combination with other aspects of the presently disclosed subject matter, for each node, the first value in the PoV corresponding to the node can define the x-axis coordinate in the two dimensional space and the second value in the PoV corresponding to the node can define the y-axis coordinate in the two dimensional space.

In accordance with further aspects and, optionally, in combination with other aspects of the presently disclosed subject matter, the spatial relationship can comprise at least one of i) an angle formed between a node and two other nodes, and ii) a distance ratio between a given node and two other nodes.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 5 illustrates pairs of values for chunks of data in accordance with certain embodiments of the presently disclosed subject matter;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent front the following discussions, it is appreciated that throughout the specification discussions utilizing terms such as "processing", "calculating", "generating", "dividing", "arranging", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non limiting example, the processor and memory block disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a non-transitory computer-readable storage medium.

The term "criterion" used in this patent specification should be expansively construed to include any compound criterion, including, for example, several criteria and/or their logical combinations.

Embodiments of the presently disclosed subject matter are not described with reference to any particular programming language. It will be appreciated that a variety of programming languages may be used to implement the teachings of the presently disclosed subject matter as described herein.

Figure 1:
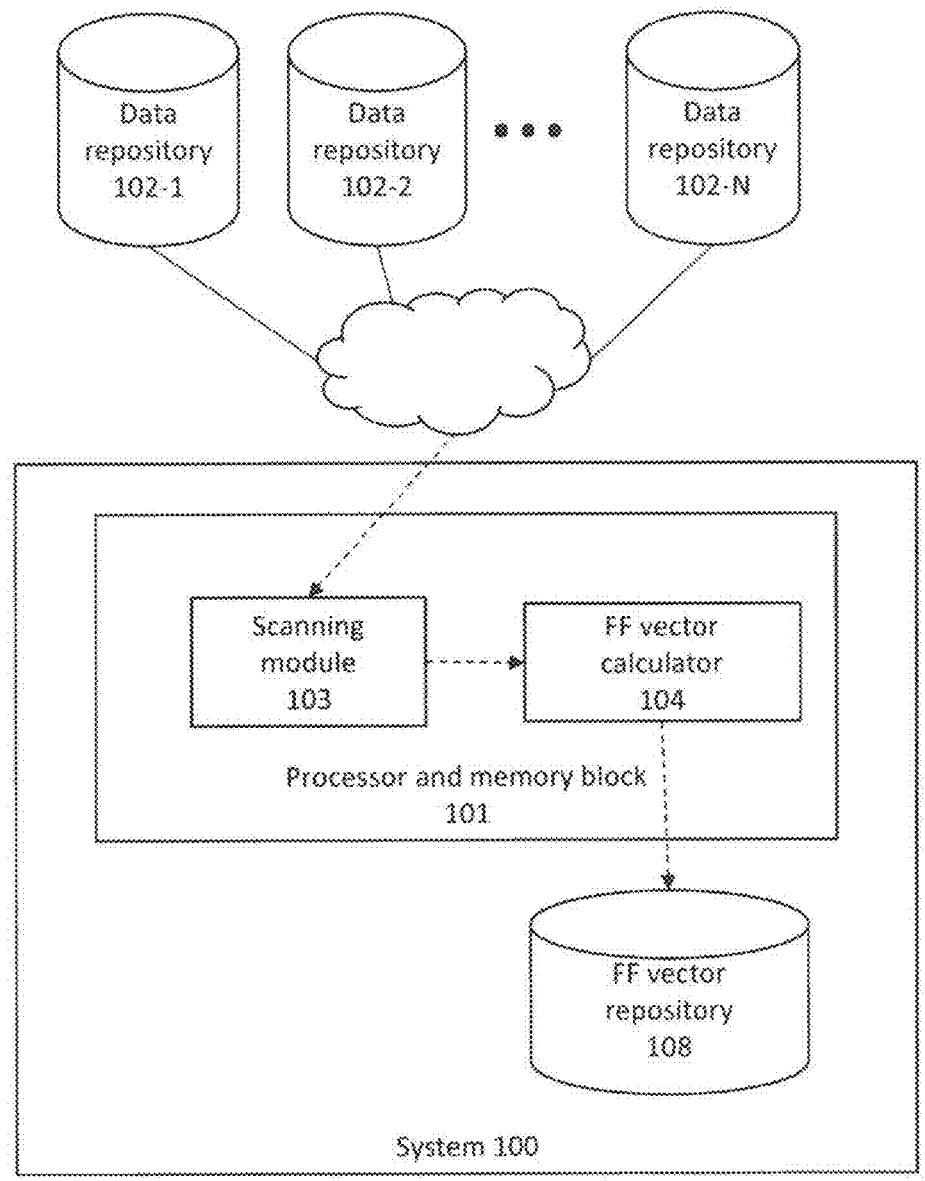
FIG. 1 illustrates a functional block diagram of a system capable of generating a file identifier in accordance with certain embodiments of the presently disclosed subject matter.

Bearing this in mind, attention is drawn to FIG. 1 illustrating a generalized functional block diagram of a system capable of generating data object identifiers. The illustrated system (100) comprises a processor and memory block (PMB) (101) configured to process a data object and generate a data object identifier. In this specification, the terms "float feature vector", "FF vector" and "FFV" are interchangeably used to refer to the data object identifier. PMB (101) can be implemented on one or more computers comprising or operatively connected to one or more data repositories (102-1)-(102-N) on which is stored one or more data objects for processing. The data objects for processing can be, e.g. files (e.g. text files, image files, video files, audio files, DLL (dynamic link library) files, EXE (executable) files, mixed-con tent type files (e.g. text and images, text and audio, etc.), unknown/uncategorized file types, etc.), portions of files, byte streams, etc. In certain embodiments, system (100) can optionally include a FF vector repository (108) configured to store FF vectors generated by PMB (101) FF vector repository (108) can be implemented on any suitable non-volatile memory (e.g. hard drive, optical disk, magnetic tape, etc.).

PMB (101) can be configured to execute several functional modules in accordance with computer-readable instructions implemented on a non-transitory computer-readable storage medium. Such functional modules are referred to hereinafter as comprised in the PMB (101). PMB (101) can comprise operatively connected scanning module (103) and FFV calculator (104). Scanning module (103) can be configured to scan the data repositories (102-1)-(102-N) for data objects for processing. FF vector calculator (104) can be configured to receive one or more input data objects from scanning module and calculate, and thereby generate, an output FFV for each input data object. FF vector calculator (104) can further be configured to store the FFVs in FF vector repository (108), optionally in conjunction with other data indicative of the corresponding input data object, such as the filename and location of the input file. Operation of PMB (101) and functional modules therein will be further detailed with reference to FIG 2.

In certain embodiments, system (100) can be operatively coupled to data repositories (102-1)-(102-N) and/or FF vector repository (108) via a data connectivity network, such as an Ethernet network (e.g. LAN, WAN, Internet, etc.)

It is noted that the teachings of the presently disclosed subject matter are not bound by the system described with reference to FIG. 1. Equivalent and/or modified functionality can be consolidated or divided in another manner and can be implemented in any appropriate combination of software with firmware and/or hardware and executed on a suitable device. It should be further noted that the system can be a standalone network entity, or integrated, fully or partly, with other network entities. The system can also be implemented in a cloud environment. Those skilled in the art will also readily appreciate that the data repositories can be consolidated or divided in other manner; databases can be shared with other systems or be provided by other systems, including third party equipment.

Figure 2:
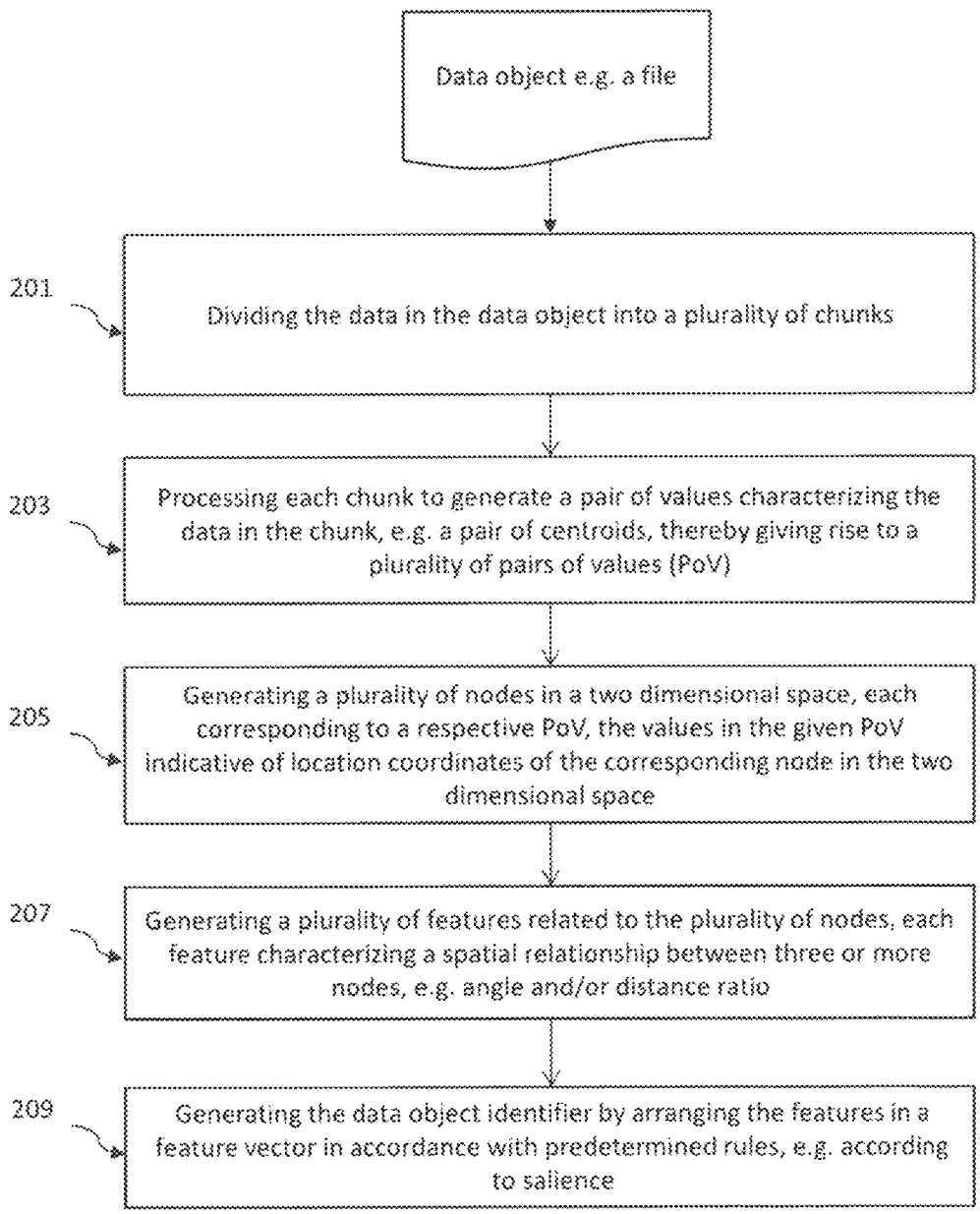
FIG. 2 illustrates a generalized flow-chart of generating a file identifier in accordance with certain embodiments of the presently disclosed subject matter.

Referring to FIG. 2. there is illustrated a generalized flow chart of generating a data object identifier in accordance with certain embodiments of the presently disclosed subject matter.

For purpose of illustration only, the following description is provided for data objects in the form of files. Those skilled in the art will readily appreciate that the teachings of the presently disclosed subject matter are, likewise, applicable to other non-file data objects.

In certain embodiments. PMB (101), e.g. scanning module (103), scans the one or more data repositories (202-1)-(102-N) and determines, based on predetermined criterions, one or more files in respect of which a file identifier is to be generated. For each of the one or more files. PMB (101), e.g. FF vector calculator (104), processes the file to generate a file identifier in respect of the file. By way of non-limiting example, it may he desirable in certain embodiments to generate a file identifier for each file on the data repositories during an initial scan, and to generate a file identifier for a subset of the files on subsequent scans. For example, during subsequent scans, the subset of files can include only newly created files (i.e. created after the previous scan) or files that have been altered since the previous scan (e.g. based the date of last file update, current vs. last known file size, etc.). Therefore, the predetermined criterions can include such things as creation date, last modified date, size, etc.

Upon receiving a file to process, PMB (101) e.g. FF vector calculator (104), divides (201) the data in the file into a plurality of chunks. In certain embodiments, each chunk has the same predetermined maximum value n (e.g. n=1 k bytes).

PMB (101), e.g. FF vector calculator (104), further processes (203) each chunk using a clustering algorithm (e.g. K-mean, Gaussian Mixture Model (GMM), Self-Organizing Map (SOM), etc.) to generate, for each chunk, a pair of values characterizing the data in the chunk, thereby giving rise to a plurality of pairs of values (PoV). In certain embodiments, the data (i.e. the byte values) in each chunk are processed using a SOM algorithm. In certain embodiments, the SOM algorithm can be configured to calculate two centroids for each chunk, the two centroids calculated for a chunk being a pair of values characterizing the data in the respective chunk.

Figure 3:
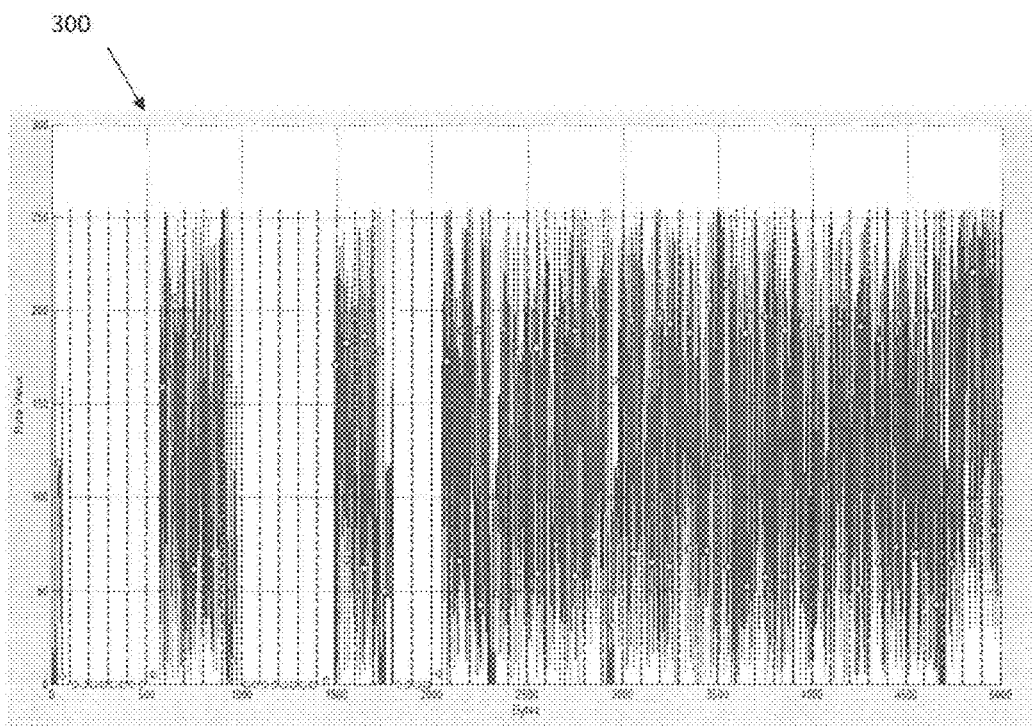
FIGS. 3 and 4 illustrate data contained in a file in accordance with certain embodiments of the presently disclosed subject matter.

FIG. 3 illustrates, by way of non-limiting example, data (300) contained in a 5 kb file. The x-axis indicates the byte number while the y-axis indicates the corresponding byte value.

Figure 4:
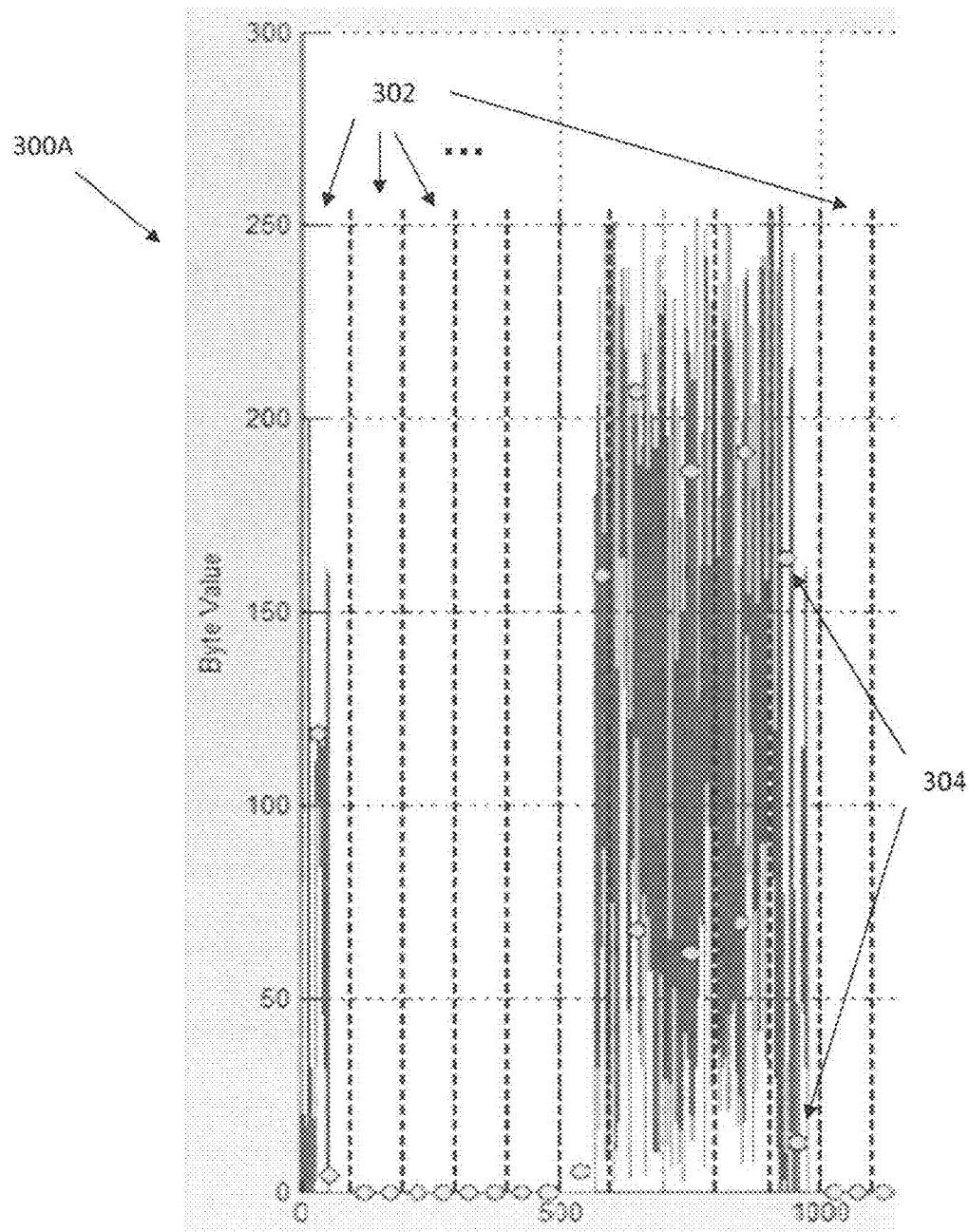

FIG. 4 illustrates a portion of FIG. 3 enlarged for clarity. As can be seen in FIG. 4, data (300A) is divided into a plurality of chunks (302) of 100 bytes per chunk (n=100). For each one of chunks (302), a pair of centroids (304) characterizes the data in the chunk. The centroids (304) of each chunk (302) can be calculated using a SOM algorithm using the byte values in the chunk of data as input to the SOM.

For each of a plurality of PoVs, PMB (101), e.g. FF vector calculator (104), generates (205) a corresponding node in a two dimensional space, thereby generating a plurality of nodes, each corresponding to a respective PoV. Each node in the two dimensional space is generated using the values in the corresponding pair of values as the location coordinates of the node in the two dimensional space. For example, the first value in the pair of values can be used as the x-axis location coordinate ("X value") of the node, while the second value in the pair of values can be used as the y-axis location coordinate of the node ("y value"). In certain embodiments, the plurality of PoVs include all PoVs above a predetermined threshold value. For example, null value PoVs (e.g. {0,0}) can be excluded in certain embodiments.

Figure 6:
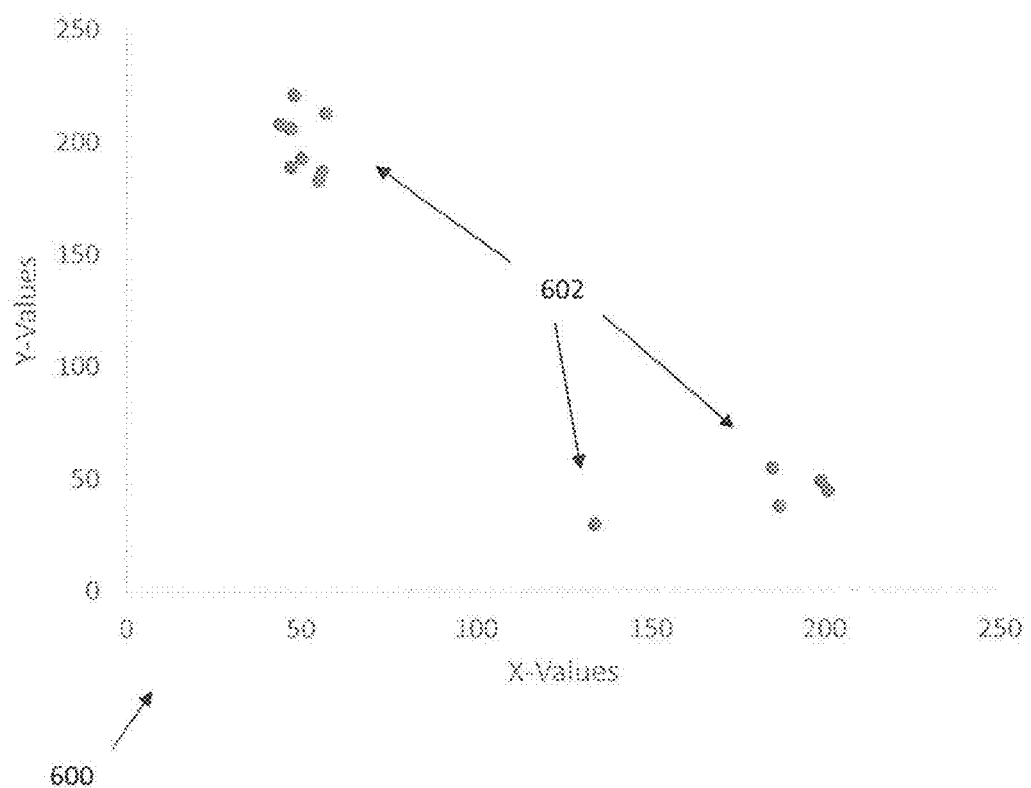
FIGS. 6 and 7 illustrate a graph of nodes in 2D space in accordance with certain embodiments of the presently disclosed subject matter.

FIG. 5 illustrates, by way of non-limiting example, using the values in a pair of values as location coordinates in 2D space. Table (500) shows hypothetical pairs of values (502) for each of thirteen chunks of data, and the x,y coordinates (504) of the corresponding nodes. FIG. 6 illustrates, by way of non-limiting example, the 2D space comprising the nodes. Graph (600) shows the location in 2D space of the thirteen nodes (602).

In certain embodiments, generating a plurality of nodes in a two dimensional space can include, e.g., generating data informative of a plurality of nodes and their respective 2D coordinates, using any method known in the art (e.g. generating a matrix, generating an image, etc.).

Optionally, the generated data informative of a plurality of nodes can he distilled to reduce extraneous data. In certain embodiments, distilling can include removing nodes that don't contribute additional meaningful data. For example, a cluster of nodes in the same general 2D location can be replaced by a single representative node. The 2D location fox placing the representative node can he chosen, e.g., by calculating the centroid of the cluster.

Figure 7:
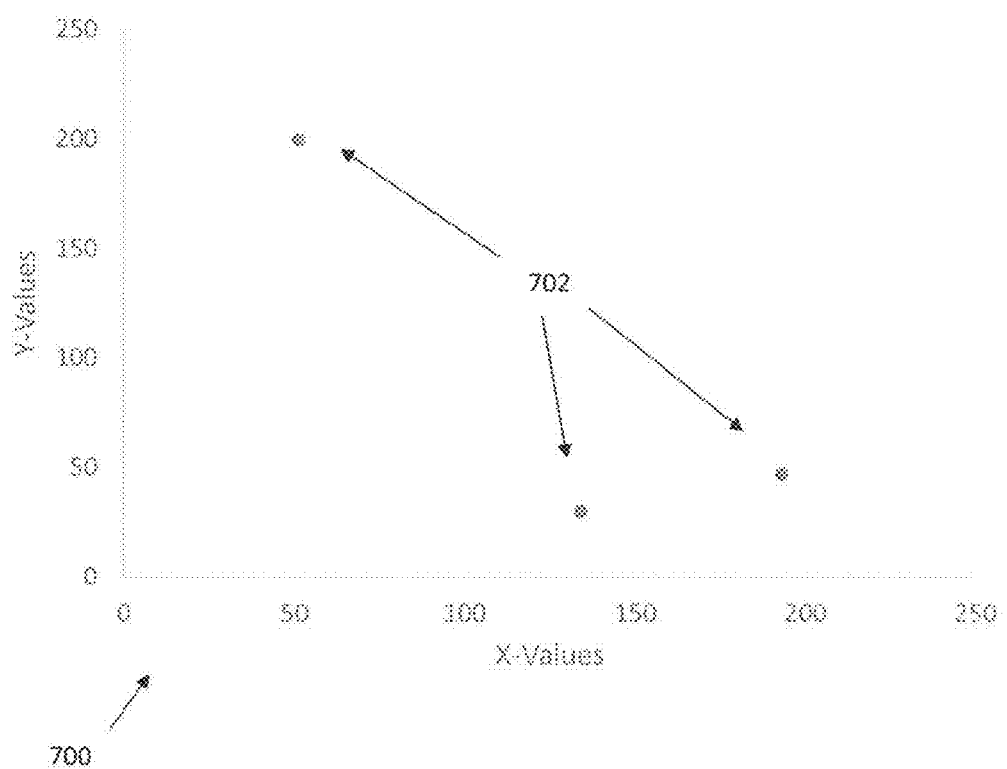

FIG. 7 illustrates, by way of non-limiting example, distilling nodes. Graph (700) shows the thirteen nodes of FIG. 6 now reduced to three nodes (702) by replacing clusters of nodes with single nodes, each representative of a respective cluster.

In certain embodiments, the generated data can he further distilled or compressed using compression techniques known in the art. By way of non-limiting example, the data can be run-length coded to reduce the size of the data.

Having generated the plurality of nodes in two dimensional space, PMB (101). e.g. FF vector calculator (104), generates (207) a plurality of features related to the plurality of nodes, each feature characterizing a spatial relationship between a group of nodes, e.g. three or more nodes. In certain embodiments, the spatial relationship can include, for the group of nodes, one or more angles and/or one or more distance ratios between nodes in the group of nodes. Each feature can he represented by one or more float values.

Figure 8:
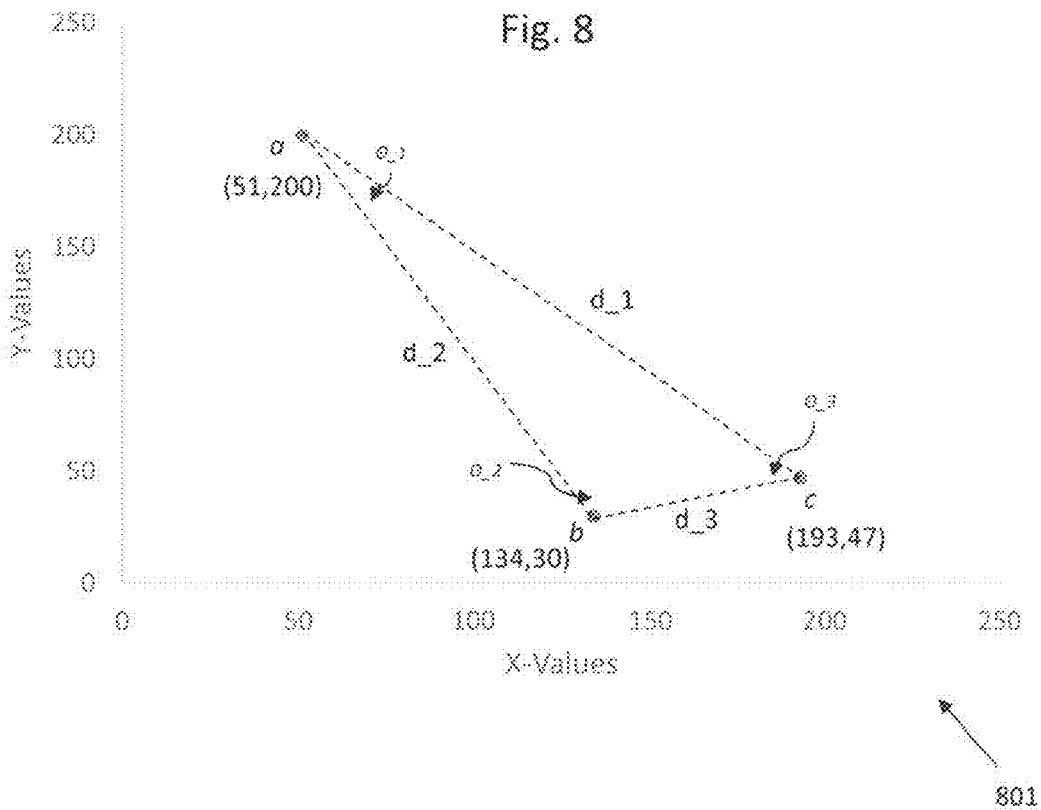
FIG. 8 illustrates features characterizing spatial relationships between nodes in a group of nodes in accordance with certain embodiments of the presently disclosed subject matter.

FIG. 8 illustrates, by way of non-limiting example, features characterizing the spatial relationship between nodes. Referring to FIG. 8, graph (801) depicts the 2D spatial relationship between the nodes of FIG. 7, now labelled a, b, and c. As illustrated in FIG. 8, the spatial relationship between nodes a, b, and c can be characterized by, e.g.:

i) angles $0\_1$, $0\_2$ and $0\_3$;
  ii) distances $d\_1$, $d\_2$ and $d\_3$; and
  iii) distance ratios $d\_1{:}d\_2$, $d\_2{:}d\_3$ and $d\_2{:}d\_3$, etc.

As further illustrated by reference to FIG. 8, features (802) (denoted $f_1 \ldots f_6$) can be generated it) respect of the group of nodes {a, b, c} indicative of the angles and distance ratios between a, b and c. These features can be represented using floating point numbers Indicative of the angles and/or distance ratios. In this embodiment, six features arc generated for each group of three nodes.

Figure 9:
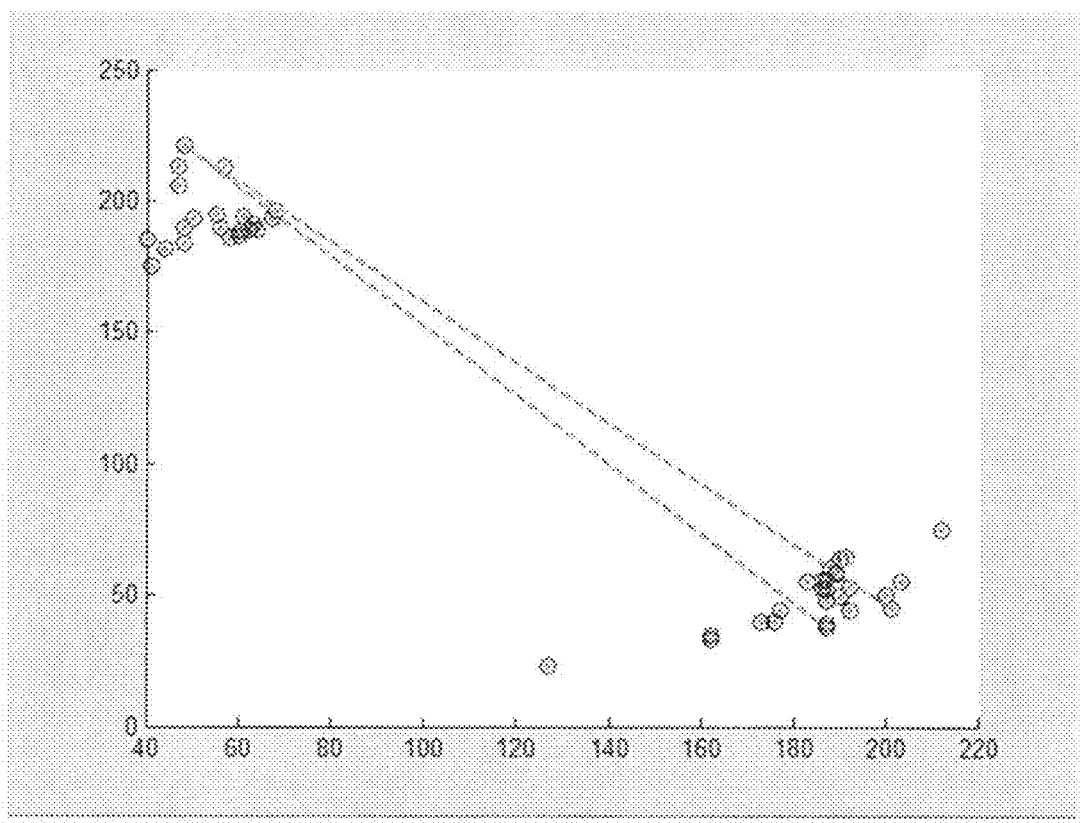
FIG. 9 illustrates an example a group of nodes amongst 36 nodes in 2D space in accordance with certain embodiments of the presently disclosed subject matter.

It should be appreciated that while the above examples illustrate features that may be generated tor three nodes, the reality is that many more than three nodes are typically generated tor a file. Thus, for example, FIG. 9 illustrates a 2D space comprising 36 nodes. In an embodiment where six features are generated for each three-node group, and a given file produces 36 nodes according to the method detailed herein, above, there would then be 7,140 (361/31 (36−3)1=7140) distinct three node groups (one of which is shown in FIG. 9), for a total of 42,840 features (7140*6=42840) characterizing the 36 nodes.

Having generated the plurality of features, PMB (101), e.g. FF vector calculator (104), then generates (209) the file identifier by arranging the features in a feature vector in accordance with predetermined rules. By way of non-limiting example, the features can be arranged in order of salience.

In some embodiments, arranging the features in a feature vector includes arranging, in order of salience, a series of objects, each object comprising k angles and l distances ratios between at least three nodes of the plurality of nodes.

In certain embodiments, the generated file identifier can be of a fixed predetermined length regardless of the size of the target file. Where necessary, truncation or null byte padding can also be used to ensure the file identifier contains the predetermined fixed number of bytes.

In certain embodiments, the size of the file identifier cart be determined as follows. For a target file with divided into chunks of N=1000 bytes, in which K nodes are used to generate each object (i.e. each object comprises 3 viewing angles and 3 distance ratios), the size of the file identifier can be calculated as:

$$Size = \frac{File\ Size}{N} \cdot K \cdot (Float\_Var\_Size + Short\_Int\_Var\_Size)$$

where:

Float_Var_Size=8 bytes (for the distance ratios); and
Short_Int_Var_Size=2 bytes (For the angle data: 0-359).

It should be appreciated that the data object identifier detailed herein can be used in a variety of ways. By way of non-limiting examples, the data object identifier can be used, e.g. to detect SD (e.g. by comparing the data object identifier generated for an input data object with other data object identifiers generated for known SD). Other examples include, e.g., identification of similar data, which in turn has application in a variety of fields including, e.g. data cleansing, duplicate data discovery, rights management (e.g. by identifying instances of file sharing), etc. Comparison of data object identifiers can be performed using any method known in the art, e.g. normalized cross correlation. Euclidean distance, etc.

It is noted that the teachings of the presently disclosed subject matter are not bound by the How chart illustrated in FIG. 2. It is also noted that whilst the How chart is described with reference to elements of system (100). this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented m a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of generating a data object identifier, the method executed by a computer and comprising:
   upon receiving a data object, dividing the data in the data object into a plurality of chunks;
   processing each chunk using a clustering algorithm to generate, for each chunk, a pair of values characterizing the data in the chunk, thereby giving rise to a plurality of pairs of values (PoV);
   generating a plurality of nodes in a two dimensional space each corresponding to a respective PoV, wherein, for any given PoV, the values in the given PoV are indicative of location coordinates of the corresponding node in the two dimensional space;
   generating a plurality of features related to the plurality of nodes, each feature characterizing a spatial relationship between three or more nodes; and
   generating the data object identifier by arranging the features in a feature vector in accordance with predetermined rules, wherein the generated data object identifier is usable for detecting similarity with other data objects whereby a level of accuracy of the detecting is increased.

2. The method of claim 1 wherein the data object is a file.

3. The method of claim 1 wherein the data is divided into chunks using a predetermined value n indicative of a maximum chunk size.

4. The method of claim 1 wherein the PoV for a chunk is generated by processing the data in the chunk using a clustering algorithm.

5. The method of claim 4 wherein the clustering algorithm is a self-organizing map algorithm.

6. The method of claim 1 wherein for each node, the first value in the PoV corresponding to the node defines the x-axis coordinate in the two dimensional space and the second value in the PoV corresponding to the node defines the y-axis coordinate in the two dimensional space.

7. The method of claim 1 wherein the spatial relationship comprises at least one of i) an angle formed between a node and two other nodes, and ii) a distance ratio between a given node and two other nodes.

8. The method of claim 1, wherein detecting similarity with other data objects is usable for at least one of: detecting sensitive data in the data object; identifying data objects with similar data; discovering data objects with duplicate data;
identifying instances of the data object sharing.

9. A system capable of generating a data object identifier comprising a processor and memory block operatively coupled to one or more data repositories, the processor and memory block configured to:
   upon receiving a data object stored on the one or more data repositories, divide the data in the data object into a plurality of chunks;

process each chunk using a clustering algorithm to generate, for each chunk, a pair of values characterizing the data in the chunk, thereby giving rise to a plurality of pairs of values (PoV);

generate a plurality of nodes in a two dimensional space each corresponding to a respective PoV, wherein, for any given PoV, the values in the given PoV are indicative of location coordinates of the corresponding node in the two dimensional space;

generate a plurality of features related to the plurality of nodes, each feature characterizing a spatial relationship between three or more nodes; and generate the data object identifier by arranging the features in a feature vector in accordance with predetermined rules, wherein the generated data object identifier is usable for detecting similarity with other data objects whereby a level of accuracy of the detecting is increased.

10. The system of claim 9 wherein the data object is a file.

11. The system of claim 9 wherein the data is divided into chunks using a predetermined value n indicative of a maximum chunk size.

12. The system of claim 9 wherein the PoV for a chunk is generated by processing the data in the chunk using a clustering algorithm.

13. The system of claim 12 wherein the clustering algorithm is a self-organizing map algorithm.

14. The system of claim 9 wherein for each node, the first value in the PoV corresponding to the node defines the x-axis coordinate in the two dimensional space and the second value in the PoV corresponding to the node defines the y-axis coordinate in the two dimensional space.

15. The system of claim 9 wherein the spatial relationship comprises at least one of i) an angle formed between a node and two other nodes, and ii) a distance ratio between a given node and two other nodes.

16. The system of claim 9, wherein detecting similarity with other data objects is usable for at least one of: detecting sensitive data in the data object; identifying data objects with similar data; discovering data objects with duplicate data;

identifying instances of the data object sharing.

17. A non-transitory computer-readable memory tangibly embodying a program of instructions executable by a computer for executing a method of generating a data object identifier, the method comprising:

upon receiving a data object, dividing the data in the data object into a plurality of chunks;

processing each chunk using a clustering algorithm to generate, for each chunk, a pair of values characterizing the data in the chunk, thereby giving rise to a plurality of pairs of values (PoV);

generating a plurality of nodes in a two dimensional space each corresponding to a respective PoV, wherein, for any given PoV, the values in the given PoV are indicative of location coordinates of the corresponding node in the two dimensional space;

generating a plurality of features related to the plurality of nodes, each feature characterizing a spatial relationship between three or more nodes; and generating the data object identifier by arranging the features in a feature vector in accordance with predetermined rules, wherein the generated data object identifier is usable for automated detecting similarity with other data objects whereby a level of accuracy of the detecting is increased.

* * * * *